United States Patent
Baldwin et al.

(10) Patent No.: US 12,259,087 B2
(45) Date of Patent: Mar. 25, 2025

(54) RAIL ACCESSORY SYSTEM WITH DIFFERENT RAIL INTERFACES AND RELATED METHODS

(71) Applicant: Paladin Healthcare LLC, Oakland, FL (US)

(72) Inventors: Robert Lee Brooks Baldwin, Oakland, FL (US); Gary M. Schindele, Oakland, FL (US); Uriel Velazquez Velazquez, Oakland, FL (US)

(73) Assignee: PALADIN HEALTHCARE LLC, Oakland, FL (US)

( * ) Notice: Subject to any disclaimer, the term of this patent is extended or adjusted under 35 U.S.C. 154(b) by 0 days.

(21) Appl. No.: 18/594,241

(22) Filed: Mar. 4, 2024

(65) Prior Publication Data
US 2024/0301994 A1  Sep. 12, 2024

Related U.S. Application Data

(60) Provisional application No. 63/489,582, filed on Mar. 10, 2023.

(51) Int. Cl.
*F16M 13/02* (2006.01)

(52) U.S. Cl.
CPC .............................. *F16M 13/022* (2013.01)

(58) Field of Classification Search
CPC ... F16M 13/022; A47F 5/0846; A47F 5/0838; A47B 96/067; A47B 95/008; A61G 12/005; A61G 13/101; A61B 90/57; A61B 90/571
See application file for complete search history.

(56) References Cited

U.S. PATENT DOCUMENTS

| | | | |
|---|---|---|---|
| 4,498,693 A | 2/1985 | Schindele | |
| 5,740,927 A * | 4/1998 | Yemini | A47F 5/0853 211/94.01 |
| 7,717,278 B2 * | 5/2010 | Kao | B25H 3/04 206/349 |

(Continued)

FOREIGN PATENT DOCUMENTS

EP    3673860    7/2020

OTHER PUBLICATIONS

Amico Co. "Equipment Rails" Equipment Rails| Amico Group of Companies https://www.amico.com/products/https://www.amico.com/products/equipment-mounts/medical-equipment-rails/equipment-rails; retrieved from internet Feb. 26, 2024 p. 6.

*Primary Examiner* — Ko H Chan
(74) *Attorney, Agent, or Firm* — Allen, Dyer, Doppelt + Gilchrist, PA

(57) ABSTRACT

A rail accessory system includes a medial body to be attached to a wall, and a first arm extending transversely from the medial body and away from the wall, the first arm having an inner surface, and an outer surface opposite the inner surface. The rail accessory system also includes a second arm extending transversely from the medial body and away from the wall. The second arm has an inner surface facing the inner surface of the first arm, and an outer surface opposite the inner surface of the second arm. The inner surfaces of the first and second arms define a first different rail interface. The outer surfaces of the first and second arms define a second different rail interface.

20 Claims, 9 Drawing Sheets

(56) References Cited

U.S. PATENT DOCUMENTS

| | | | |
|---|---|---|---|
| 8,136,775 B2* | 3/2012 | Chiang | F16M 11/2085 |
| | | | 248/225.11 |
| 9,956,681 B2* | 5/2018 | Kao | B25H 3/04 |
| 10,159,616 B2 | 12/2018 | Newkirk et al. | |
| 10,603,785 B1* | 3/2020 | Hsieh | B25H 3/003 |
| 10,799,041 B1* | 10/2020 | Lawson | A47F 5/103 |
| 2010/0001159 A1* | 1/2010 | Kao | B25H 3/04 |
| | | | 248/316.4 |
| 2013/0322044 A1 | 12/2013 | Kusumi et al. | |
| 2014/0205371 A1 | 7/2014 | Bally | |
| 2017/0224569 A1 | 8/2017 | Pfeuffer et al. | |
| 2017/0226700 A1 | 8/2017 | Ellis | |
| 2023/0363553 A1* | 11/2023 | Nelson | A47F 5/0846 |

* cited by examiner

RAIL ACCESSORY SYSTEM WITH DIFFERENT RAIL INTERFACES AND RELATED METHODS

RELATED APPLICATION

This application is based upon prior filed copending application Ser. No. 63/489,582 filed Mar. 10, 2023, the entire subject matter of which is incorporated herein by reference in its entirety.

TECHNICAL FIELD

The present disclosure relates to the field of healthcare equipment, and, more particularly, to a rail accessory system and related methods.

BACKGROUND

In healthcare environments, it is common to have a wall rail system for carrying various equipment, for example, lighting, patient monitoring equipment, patient respiration equipment, and computer equipment. One common application shown in FIG. 1A includes the rail system 500 installed adjacent to the headboard of a bed within a healthcare environment (i.e., a headwall rail system). FIG. 1B shows the rail system 600 installed in an examination room. There are several approaches to the rail system. For example, FIG. 2 shows a Fairfield style rail system 700 installed on a wall 701 with an accessory 703 attached thereto, and FIG. 3 shows a modular style rail system 800 installed on a wall 801 with an accessory anchor 803 attached thereto.

SUMMARY

Generally, a rail accessory system comprises a medial body to be attached to a wall, and a first arm extending transversely from the medial body and away from the wall, the first arm having an inner surface, and an outer surface opposite the inner surface. The rail accessory system also includes a second arm extending transversely from the medial body and away from the wall. The second arm has an inner surface facing the inner surface of the first arm, and an outer surface opposite the inner surface of the second arm. The inner surfaces of the first and second arms define a first different rail interface. The outer surfaces of the first and second arms define a second different rail interface.

In particular, the inner surface of the first arm may include a first slot adjacent the medial body, and the inner surface of the second arm may include a second slot adjacent the medial body. The first slot is vertically aligned with the second slot. The inner surface of the first arm may include a first protrusion adjacent the first slot and extending away from the inner surface of the first arm. The inner surface of the first arm may include a second protrusion spaced apart from the first protrusion. The inner surface of the first arm may include a curved recess between the first protrusion and the second protrusion. The second protrusion may extend away from the inner surface of the first arm a distance greater than that of the first protrusion.

Also, the inner surface of the second arm may include a first protrusion adjacent the second slot and extending away from the inner surface of the second arm. The inner surface of the second arm may include a straight portion extending from the first protrusion to a distal end of the second arm. The outer surface of the first arm may include a first outer curved recess, and the outer surface of the second arm may include a second outer curved recess, the first outer curved recess being vertically aligned with the second outer curved recess.

Another aspect is directed to a rail accessory assembly comprising a rail accessory system. The rail accessory system comprises a medial body to be attached to a wall, and a first arm extending transversely from the medial body and away from the wall, the first arm having an inner surface, and an outer surface opposite the inner surface. The rail accessory system also includes a second arm extending transversely from the medial body and away from the wall. The second arm has an inner surface facing the inner surface of the first arm, and an outer surface opposite the inner surface of the second arm. The inner surfaces of the first and second arms define a first different rail interface. The outer surfaces of the first and second arms define a second different rail interface. The rail accessory assembly also includes a plurality of devices mounted on the first different rail interface and the second different rail interface.

Another aspect is directed to a method of making a rail accessory system. The method comprises forming a medial body to be attached to a wall, and forming a first arm extending transversely from the medial body and away from the wall. The first arm has an inner surface, and an outer surface opposite the inner surface. The method also includes forming a second arm extending transversely from the medial body and away from the wall, the second arm having an inner surface facing the inner surface of the first arm, and an outer surface opposite the inner surface of the second arm. The inner surfaces of the first and second arms defines a first different rail interface, and the outer surfaces of the first and second arms defines a second different rail interface.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1A:
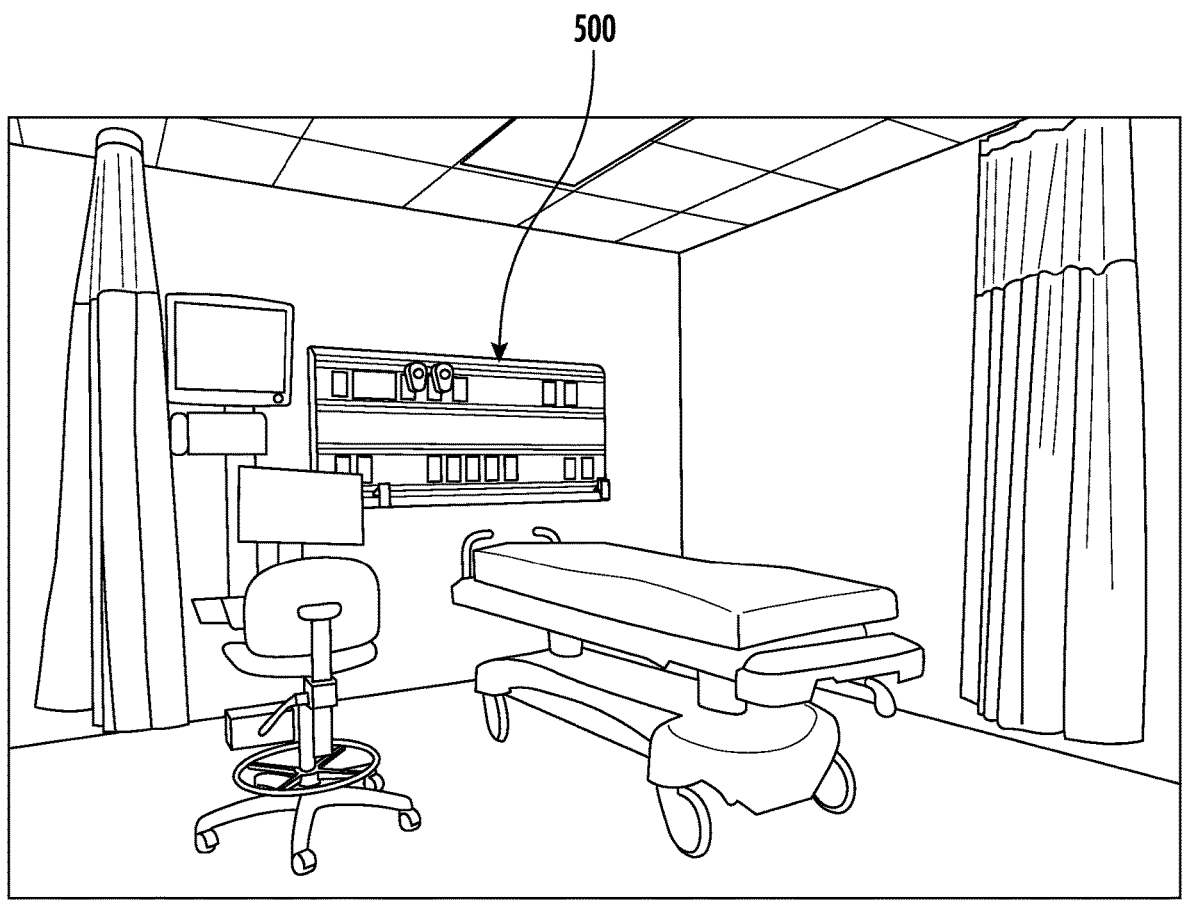
FIGS. 1A and 1B are images of rail accessory systems, according to the prior art.
Figure 1B:
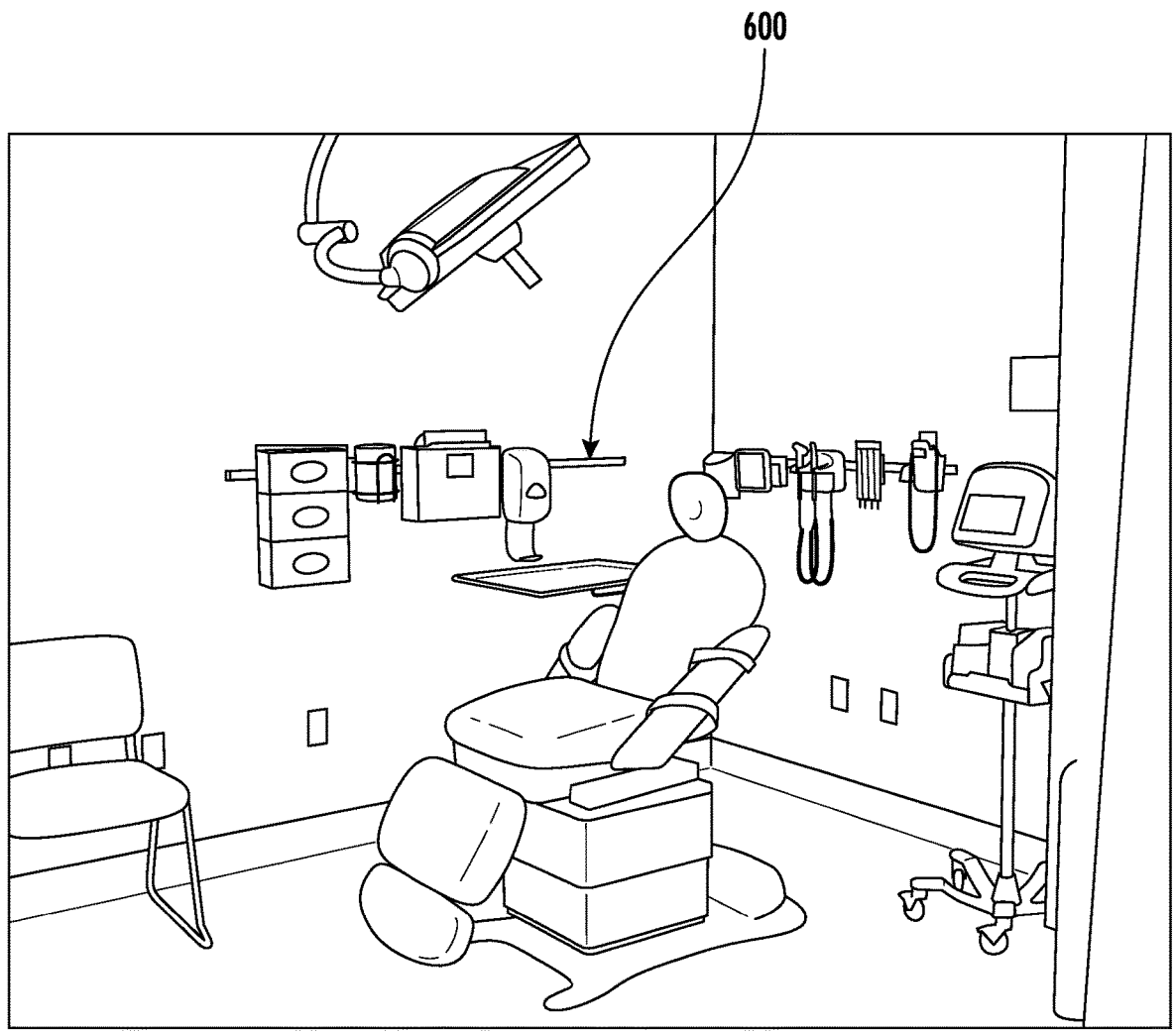
Figure 2:
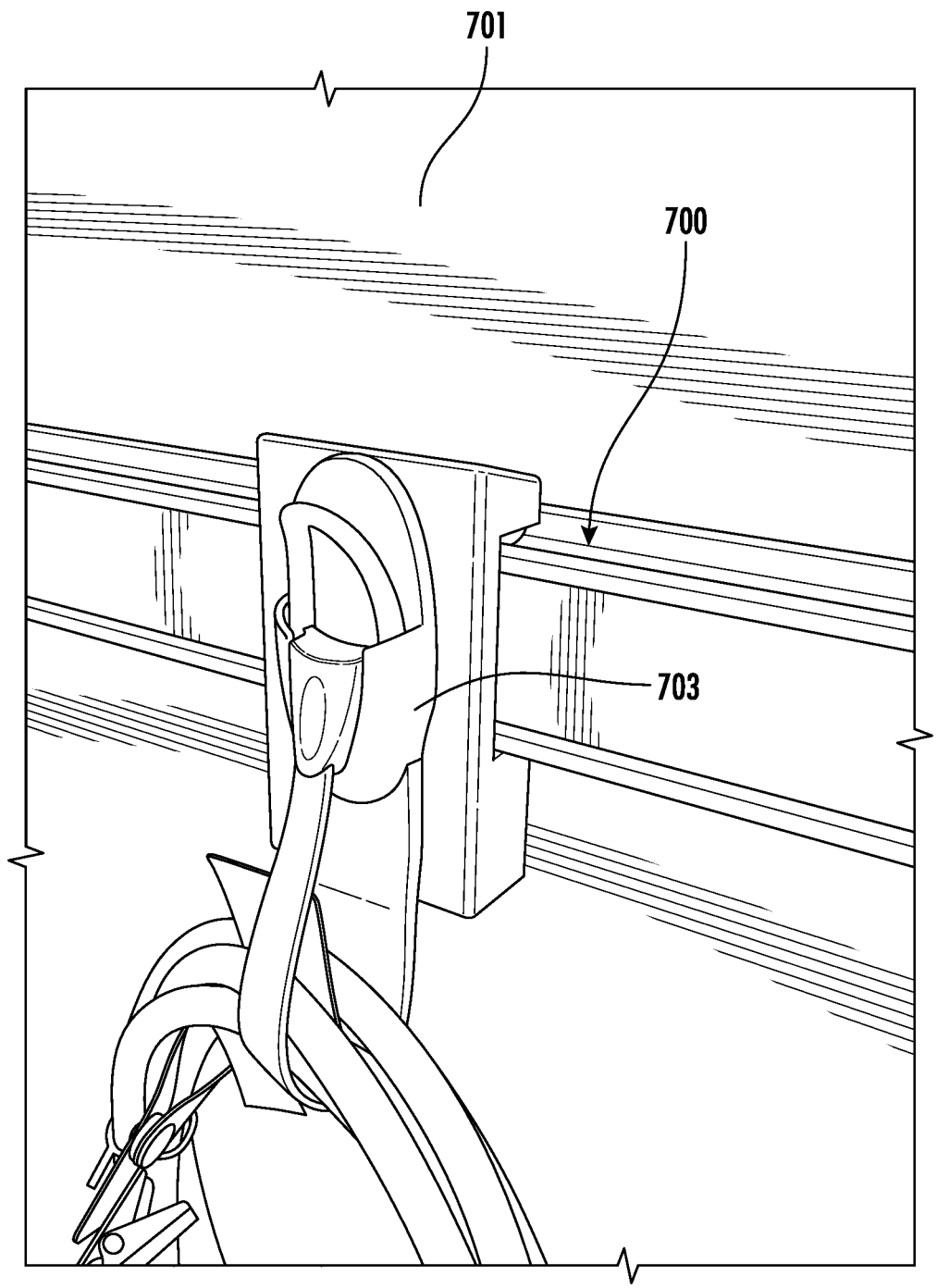
FIGS. 2 and 3 are images of accessories coupled to different rail accessory systems, according to the prior art.
Figure 3:
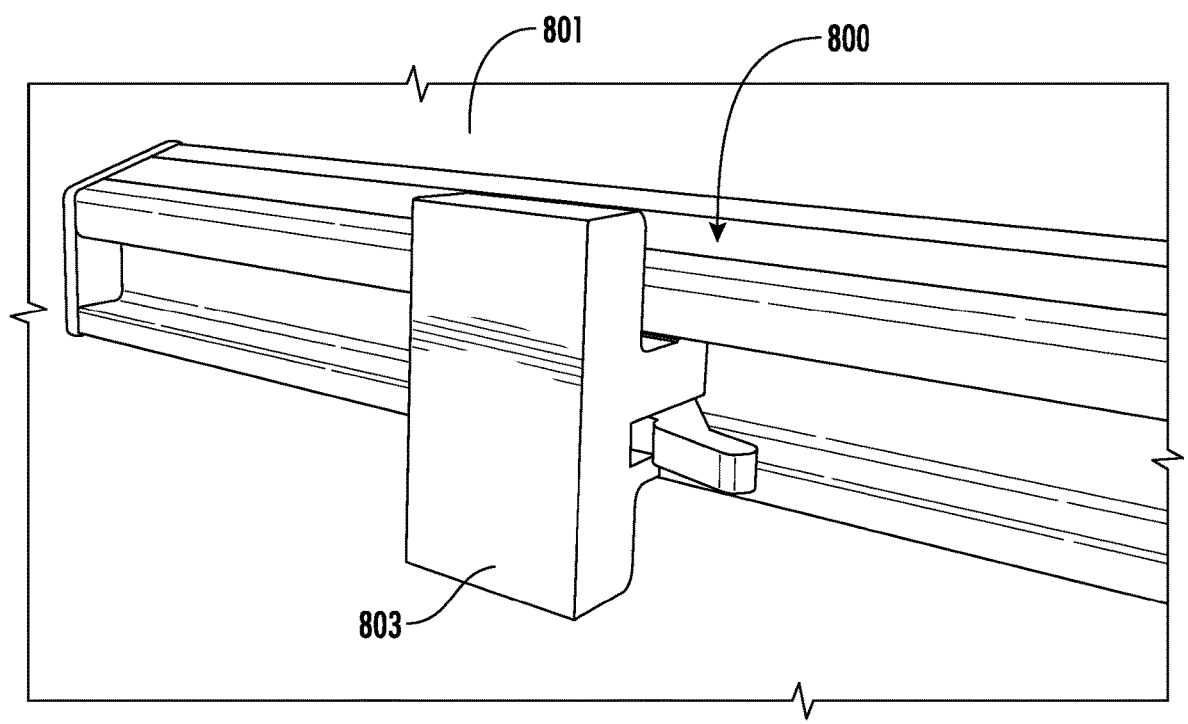
Figure 4:
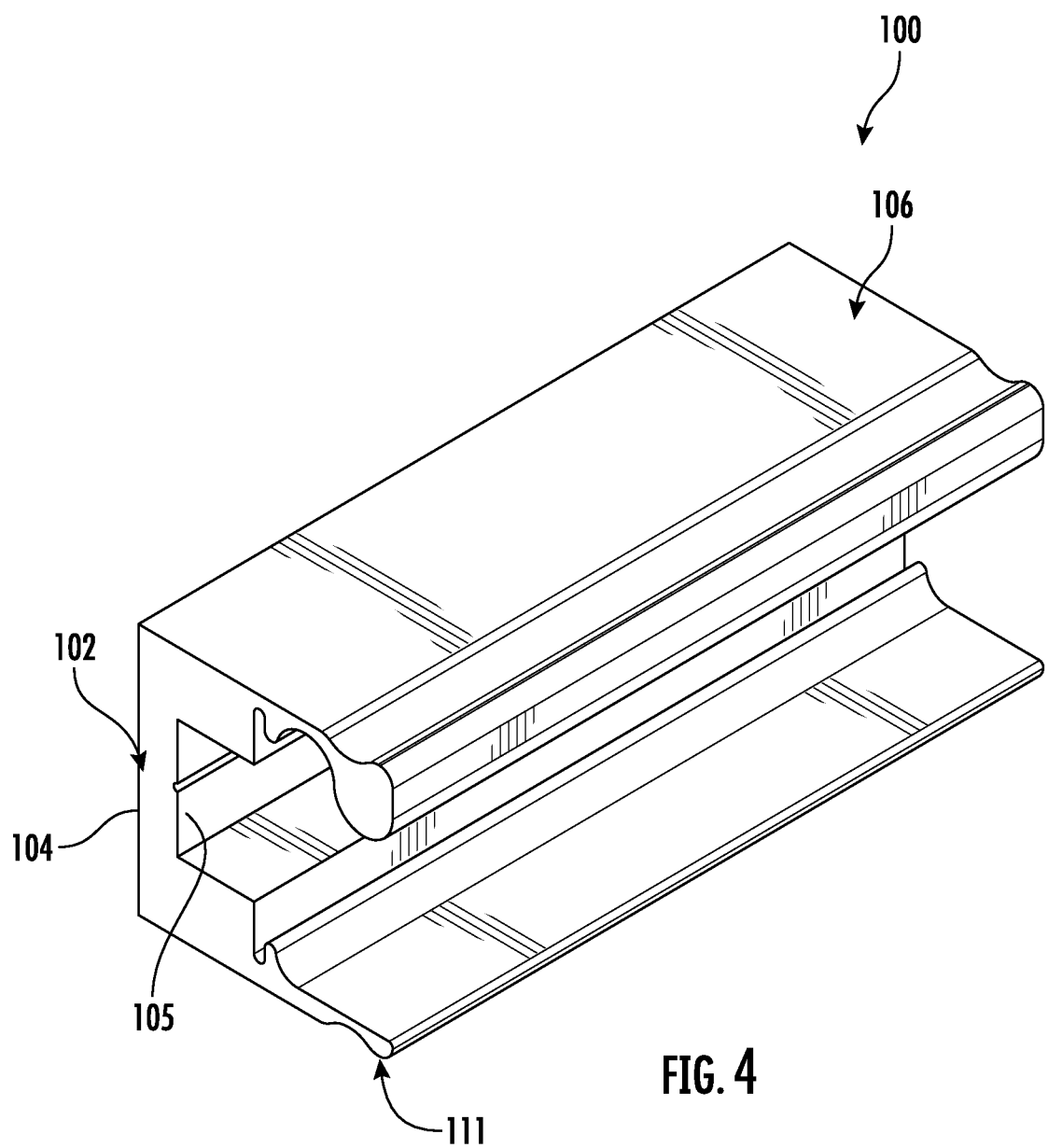
FIG. 4 is a perspective view of a rail accessory system, according to the present disclosure.
Figure 5:
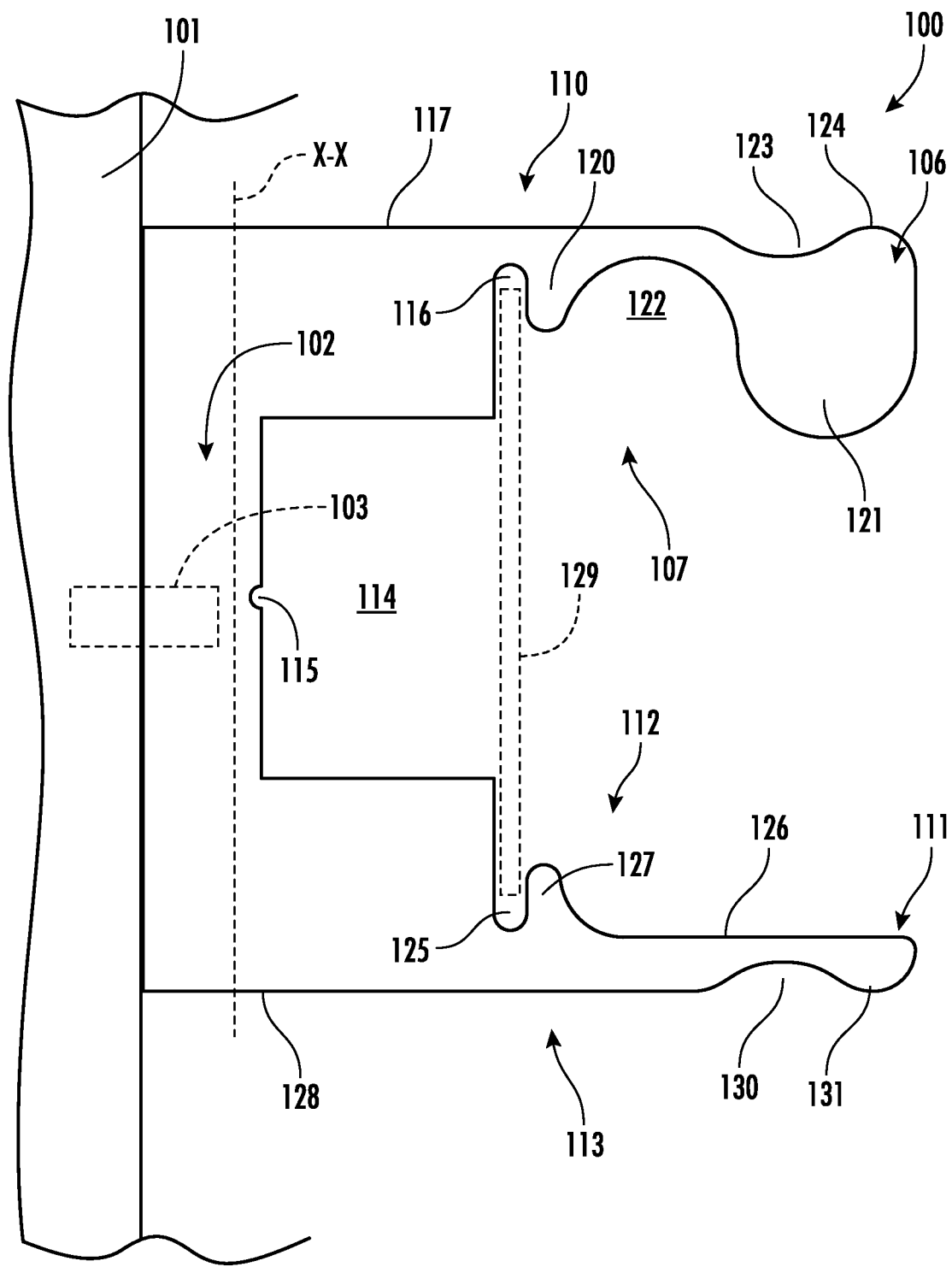
FIG. 5 is a side view of the rail accessory system of FIG. 4 installed on a wall.

Referring to FIGS. 4-5, a rail accessory system 100 according to the present disclosure is now described. The rail accessory system 100 may comprise any rigid material (e.g., aluminum, polymer) with sufficient mechanical strength to carry the accessories for the desired application. The rail accessory system 100 may be fabricated to be integral, for example, via an extrusion process, or may be welded in other embodiments.

As will be appreciated, the rail accessory system 100 may be coupled to a wall 101 or bed in a healthcare application, for example. The rail accessory system 100 includes a medial body 102 to be attached to the wall 101 via one or more fasteners 103. The medial body 102 illustratively includes a proximal end 104 comprising a substantially flat surface to abut the wall 101. The medial body 102 illustratively includes a distal end 105 opposite the proximal end 104 and facing away from the wall 101.

The rail accessory system 100 includes a first arm 106 extending transversely to the distal end 105 of the medial body 102 and away from the wall 101. The first arm 106 has an inner surface 107, and an outer surface 110. The rail accessory system 100 also includes a second arm 111 extending transversely to the distal end 105 of the medial body 102 and away from the wall 101. The second arm 111 has an inner surface 112 facing the inner surface 107 of the first arm 106, and an outer surface 113 opposite the inner surface.

The first and second arms 106, 111 are substantially parallel to each other (i.e., ±° 10 of parallel). The first arm 106 and the second arm 111 extend substantially perpendicular (i.e., ±° 10 of perpendicular) to the wall 101 and a longitudinal axis x-x of the medial body 102.

The distal end 105 of the medial body 102 defines a medial recess 114 between the first and second arms 106, 111. The medial recess 114 is illustratively rectangle-shaped, and includes a radiuses longitudinal slot 115 therein.

The inner surface 107 of the first arm 106 illustratively includes a slot 116 adjacent the medial recess 114 with a curved end, and a first protrusion 120 adjacent the slot and extending away from the inner surface. The first protrusion 120 also has a curved end. The inner surface 107 of the first arm 106 illustratively includes a second protrusion 121 at a distal end of the first arm 106 and having a curved end. The second protrusion 121 extends away from the inner surface 107 a greater distance than the first protrusion 120. The inner surface 107 of the first arm 106 illustratively includes a curved recess 122 between the first protrusion 120 and the second protrusion 121. The outer surface 110 of the first arm 106 illustratively includes a straight portion 117 extending from the wall 101, an outer curved recess 123 at a distal end of the straight edge, and an outer curved protrusion 124 at a distal end of the first arm.

The inner surface 112 of the second arm 111 illustratively includes a slot 125 adjacent the medial recess 114 with a curved end, and a first protrusion 127 adjacent the slot and extending away from the inner surface. The first protrusion 127 also has a curved end. The inner surface 112 of the second arm 111 illustratively includes a straight portion 126 extending from the first protrusion 127 to a distal end of the second arm 111. The outer surface 113 of the second arm 111 illustratively includes a straight portion 128 extending from the wall 101, an outer curved recess 130 at a distal end of the straight portion, and an outer curved protrusion 131 at a distal end of the second arm. As will be appreciated, the slots 116, 125 are vertically aligned with each other and are provided to receive a decorative laminate strip 129 in some embodiments, for aesthetic or informational purposes.

As perhaps best seen in FIG. 5, the inner surfaces 107, 112 of the first and second arms 106, 111 define a first different rail interface, in particular, a modular style rail interface. The outer surfaces 110, 113 of the first and second arms 106, 111 define a second different rail interface, in particular, a Fairfield style rail interface.

In existing approaches, users would have to purchase accessories that fit the installed rail system Incompatible equipment would need to be retrofitted or replaced, which increases the cost. Advantageously, the rail accessory system 100 supports multiple different rail system interfaces Another aspect is directed to a method of making a rail accessory system 100. The method includes forming a medial body 102 to be attached to a wall 101, and forming a first arm 106 to extend transversely to the medial body and away from the wall. The first arm 106 has an inner surface 107, and an outer surface 110. The method also includes forming a second arm 111 to extend transversely to the medial body 102 and away from the wall 101. The second arm 111 has an inner surface 112 facing the inner surface 107 of the first arm 106, and an outer surface 113. The inner surfaces 107, 112 of the first and second arms 106, 111 define a first different rail interface. The outer surfaces 110, 113 of the first and second arms 106, 111 define a second different rail interface.

Figure 6:
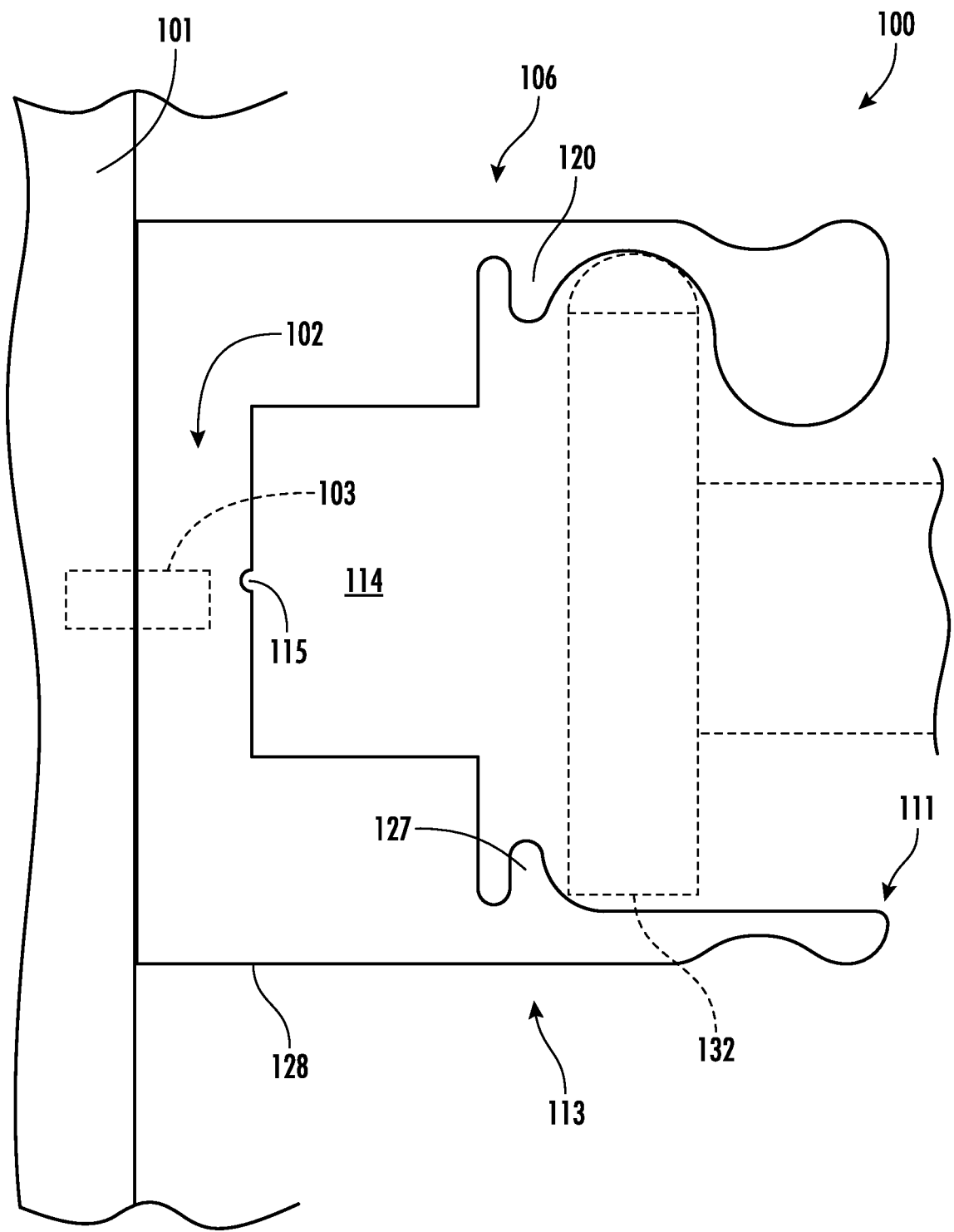
FIG. 6 is a side view of a rail accessory assembly including the rail accessory system of FIG. 4 and a modular style rail bracket accessory installed on a wall.
Figure 7:
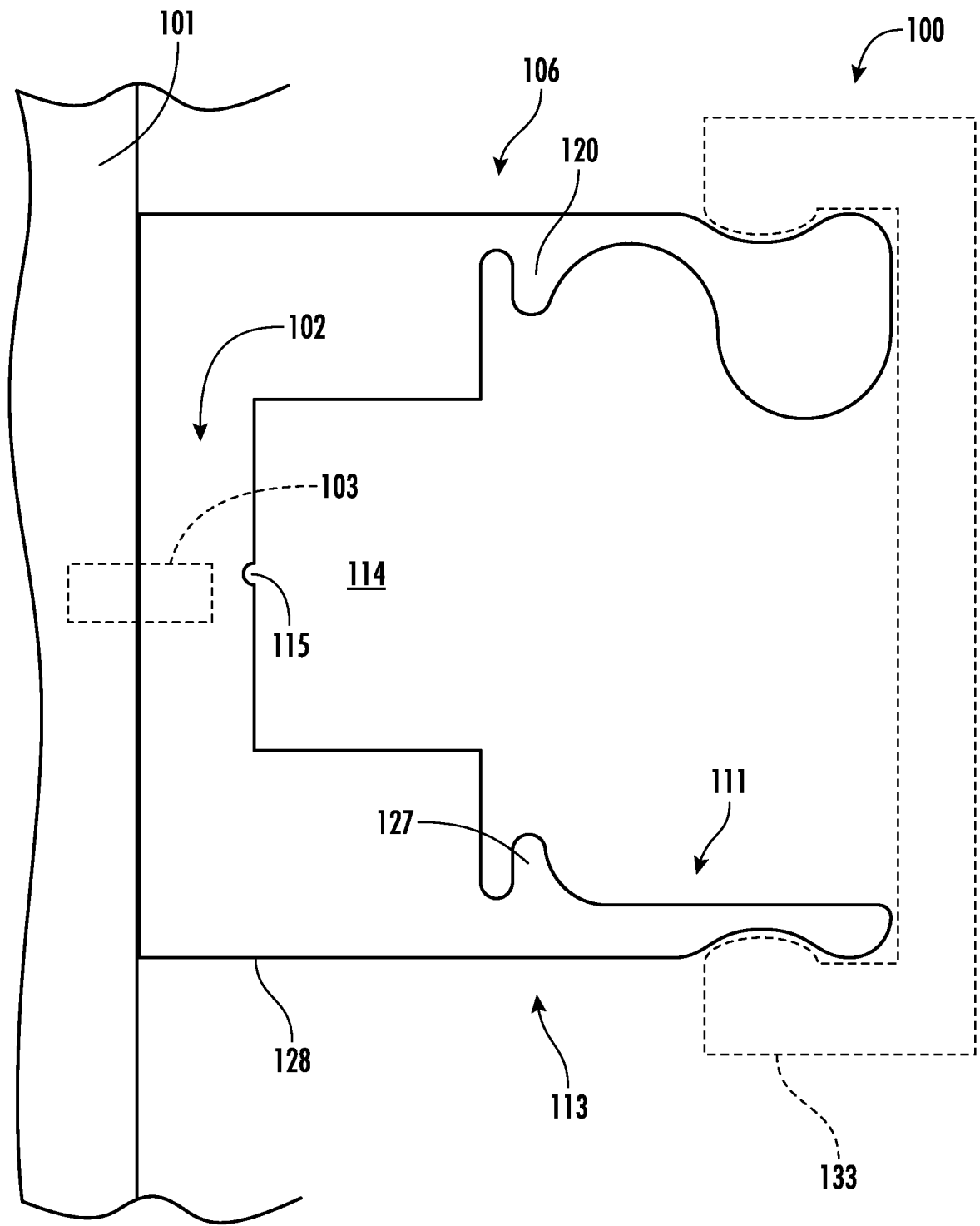
FIG. 7 is a side view of a rail accessory assembly including the rail accessory system of FIG. 4 and a Fairfield style rail bracket accessory installed on a wall.
Figure 8:
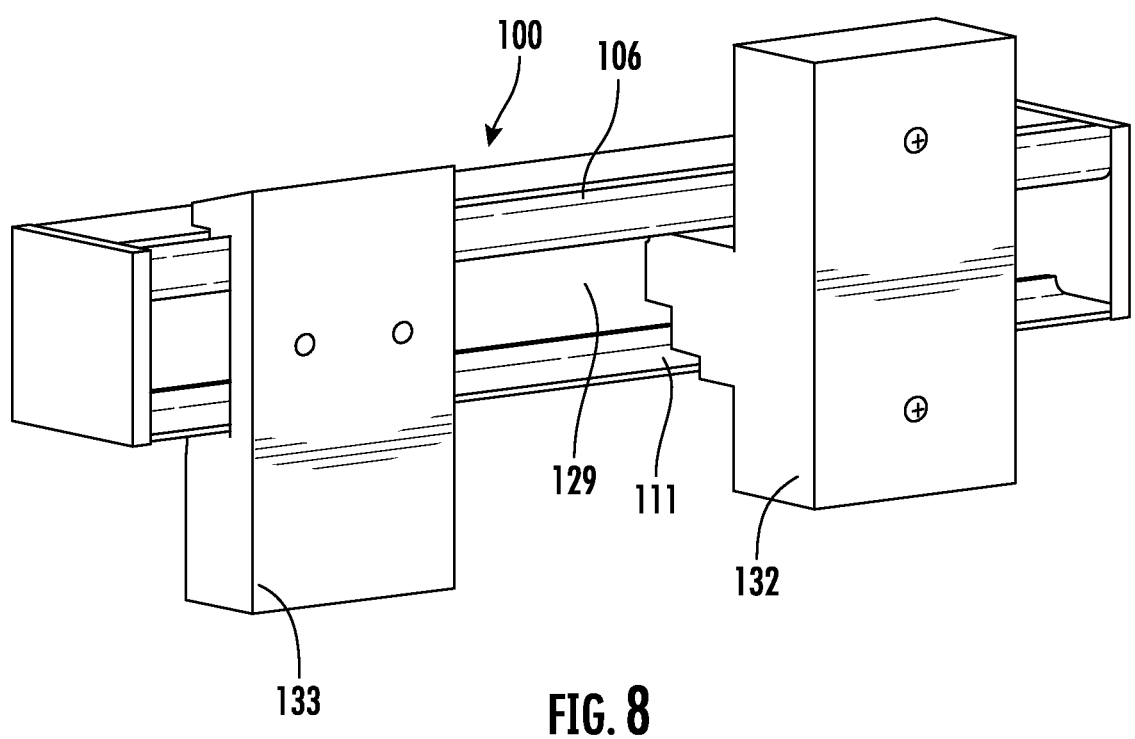
FIG. 8 is a perspective view of a rail accessory assembly including the rail accessory system of FIG. 4 with the Fairfield style rail bracket accessory and the modular style rail bracket accessory.

Referring to FIGS. 6-7, a rail accessory assembly illustratively includes a rail accessory system 100, and first and second devices 132-133 mounted on the first different rail interface and the second different rail interface. The first device 132 engages with the inner surfaces 107, 112 of the first and second arms 106, 111 (i.e., the modular style rail interface). The second device 133 engages with the outer surfaces 110, 113 of the first and second arms 106, 111 (i.e., the Fairfield style rail interface). Although these devices are depicted separately, it should be appreciated that the rail accessory system 100 may simultaneously receive both of the first and second devices 132-133 on different longitudinal portions of the rail, as shown in FIG. 8.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A rail accessory system comprising:
   a medial body to be attached to a wall;
   a first arm extending transversely from the medial body and away from the wall, the first arm having an inner surface, and an outer surface opposite the inner surface; and
   a second arm extending transversely from the medial body and away from the wall, the second arm having an inner surface facing the inner surface of the first arm, and an outer surface opposite the inner surface of the second arm;
   the inner surfaces of the first and second arms defining a first rail interface;
   the outer surfaces of the first and second arms defining a second rail interface being different from the first rail interface;

the inner surface of the first arm comprising
a first slot adjacent the medial body,
a first protrusion adjacent the first slot and extending away from the inner surface of the first arm,
a second protrusion spaced apart from the first protrusion, and
a curved recess between the first protrusion and the second protrusion;
the inner surface of the second arm comprising a second slot adjacent the medial body, the first slot being vertically aligned with the second slot.

2. The rail accessory system of claim 1 wherein the second protrusion extends away from the inner surface of the first arm a distance greater than that of the first protrusion.

3. The rail accessory system of claim 1 wherein the inner surface of the second arm includes a first protrusion adjacent the second slot and extending away from the inner surface of the second arm.

4. The rail accessory system of claim 3 wherein the inner surface of the second arm includes a straight portion extending from the first protrusion to a distal end of the second arm.

5. The rail accessory system of claim 1 wherein the outer surface of the first arm includes a first outer curved recess; and wherein the outer surface of the second arm includes a second outer curved recess, the first outer curved recess being vertically aligned with the second outer curved recess.

6. A rail accessory assembly comprising:
a rail accessory system comprising
a medial body to be attached to a wall,
a first arm extending transversely from the medial body and away from the wall, the first arm having an inner surface, and an outer surface opposite the inner surface, and
a second arm extending transversely from the medial body and away from the wall, the second arm having an inner surface facing the inner surface of the first arm, and an outer surface opposite the inner surface of the second arm,
the inner surfaces of the first and second arms defining a first rail interface,
the outer surfaces of the first and second arms defining a second rail interface being different from the first rail interface,
the inner surface of the first arm comprising
a first slot adjacent the medial body,
a first protrusion adjacent the first slot and extending away from the inner surface of the first arm,
a second protrusion spaced apart from the first protrusion, and
a curved recess between the first protrusion and the second protrusion,
the inner surface of the second arm comprising a second slot adjacent the medial body, the first slot being vertically aligned with the second slot; and
a plurality of devices mounted on the first different rail interface and the second different rail interface.

7. The rail accessory assembly of claim 6 wherein the second protrusion extends away from the inner surface of the first arm a distance greater than that of the first protrusion.

8. The rail accessory assembly of claim 6 wherein the inner surface of the second arm includes a first protrusion adjacent the second slot and extending away from the inner surface of the second arm.

9. The rail accessory assembly of claim 8 wherein the inner surface of the second arm includes a straight portion extending from the first protrusion to a distal end of the second arm.

10. The rail accessory assembly of claim 6 wherein the outer surface of the first arm includes a first outer curved recess; and wherein the outer surface of the second arm includes a second outer curved recess, the first outer curved recess being vertically aligned with the second outer curved recess.

11. A method of making a rail accessory system, the method comprising:
forming a medial body to be attached to a wall;
forming a first arm extending transversely from the medial body and to extend away from the wall, the first arm having an inner surface, and an outer surface opposite the inner surface; and
forming a second arm extending transversely from the medial body and to extend away from the wall, the second arm having an inner surface facing the inner surface of the first arm, and an outer surface opposite the inner surface of the second arm;
the inner surfaces of the first and second arms defining a first rail interface;
the outer surfaces of the first and second arms defining a second rail interface being different from the first rail interface;
the inner surface of the first arm comprising
a first slot adjacent the medial body,
a first protrusion adjacent the first slot and extending away from the inner surface of the first arm,
a second protrusion spaced apart from the first protrusion, and
a curved recess between the first protrusion and the second protrusion;
the inner surface of the second arm comprising a second slot adjacent the medial body, the first slot being vertically aligned with the second slot.

12. The method of claim 11 wherein the forming of the medial body, the forming of the first arm, and the forming of the second arm each comprises an extrusion process.

13. The method of claim 11 wherein the first arm and the second arm are substantially parallel to each other; and wherein the first arm and the second arm are to be substantially perpendicular to the wall.

14. The method of claim 11 wherein the medial body comprises includes a proximal end to abut the wall, and a distal end opposite the proximal end and to face away from the wall; wherein the proximal end of the medial body is flat; and wherein the distal end of the medial body defines a medial recess.

15. The rail accessory system of claim 1 wherein the first arm and the second arm are substantially parallel to each other; and wherein the first arm and the second arm are substantially perpendicular to the wall.

16. The rail accessory system of claim 1 wherein the medial body comprises includes a proximal end to abut the wall, and a distal end opposite the proximal end and facing away from the wall.

17. The rail accessory system of claim 16 wherein the proximal end of the medial body is flat; and wherein the distal end of the medial body defines a medial recess.

18. The rail accessory assembly of claim 6 wherein the first arm and the second arm are substantially parallel to each other; and wherein the first arm and the second arm are substantially perpendicular to the wall.

19. The rail accessory assembly of claim 6 wherein the medial body comprises includes a proximal end to abut the wall, and a distal end opposite the proximal end and facing away from the wall.

20. The rail accessory assembly of claim 19 wherein the proximal end of the medial body is flat; and wherein the distal end of the medial body defines a medial recess.

\* \* \* \* \*